(12) United States Patent
Lee

(10) Patent No.: US 10,175,260 B2
(45) Date of Patent: Jan. 8, 2019

(54) APPARATUS AND METHOD FOR MEASURING MOTOR SPEED

(71) Applicant: HYUNDAI MOBIS CO., LTD., Seoul (KR)

(72) Inventor: Jae Hyun Lee, Anyang-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 219 days.

(21) Appl. No.: 15/202,163

(22) Filed: Jul. 5, 2016

(65) Prior Publication Data

US 2017/0016929 A1  Jan. 19, 2017

(30) Foreign Application Priority Data

Jul. 13, 2015  (KR) .................. 10-2015-0099404

(51) Int. Cl.
*G01P 3/64*  (2006.01)
*G01P 3/481*  (2006.01)
*G01D 5/244*  (2006.01)

(52) U.S. Cl.
CPC .......... *G01P 3/481* (2013.01); *G01D 5/24495* (2013.01)

(58) Field of Classification Search
CPC .................. G01D 5/24495; G01P 3/481
See application file for complete search history.

(56) References Cited

U.S. PATENT DOCUMENTS

| RE34,183 E | * | 2/1993 | Wilens | F02P 3/0456 123/406.19 |
| 6,429,936 B1 | * | 8/2002 | Scaduto | G01N 21/6458 250/458.1 |
| 2002/0079706 A1 | * | 6/2002 | Rebsdorf | H02P 9/007 290/55 |
| 2007/0043528 A1 | * | 2/2007 | Bae | G01P 3/48 702/142 |
| 2010/0292840 A1 | * | 11/2010 | Ruan | B25J 5/007 700/259 |
| 2010/0303460 A1 | * | 12/2010 | Hunter | G01D 5/24419 398/25 |
| 2012/0249028 A1 | * | 10/2012 | von Berg | G01D 5/24476 318/400.05 |

FOREIGN PATENT DOCUMENTS

DE       4406606 A1 *  9/1995  ............. G01P 3/481
KR    10-2004-0017954      3/2004

* cited by examiner

*Primary Examiner* — Francis C Gray
(74) *Attorney, Agent, or Firm* — H.C. Park & Associates, PLC

(57) ABSTRACT

An apparatus for measuring motor speed may include: an encoder configured to output a signal based on revolution of a motor; and a control unit configured to detect a mechanical angle of the motor according to an output signal of the encoder, estimate an actual angle of the motor based on the detected mechanical angle, and calculate the speed of the motor by differentiating the estimated actual angle.

9 Claims, 5 Drawing Sheets

APPARATUS AND METHOD FOR MEASURING MOTOR SPEED

CROSS-REFERENCES TO RELATED APPLICATION

The present application claims priority from and the benefit of Korean Application No. 10-2015-0099404, filed on Jul. 13, 2015, which is hereby incorporated by reference for all purposes as if fully set forth herein.

BACKGROUND

Field

Exemplary embodiments relate to an apparatus and method for measuring motor speed, and more particularly, to an apparatus and method for measuring motor speed using a low-resolution encoder.

Discussion of the Background

In general, the speed of a motor is measured through a rotary encoder. The rotary encoder includes an absolute encoder which outputs the absolute position of a shaft and an incremental encoder which outputs information on a motion of a shaft.

When such an encoder is used to measure the speed of a motor, the accuracy of the measurement is generally determined by the resolution of the encoder, which is defined by PPR (Pulse Per Revolution). That is, when a high-resolution encoder is used, the accuracy of the measured motor speed may be increased more than when a low-resolution encoder is used.

However, since the high-resolution encoder is more expensive than the low-resolution encoder, the high-resolution encoder is disadvantageous in terms of cost.

The related art of the present invention is disclosed in Korean Patent Laid-open Publication No. 10-2004-0017954 published on Mar. 2, 2004.

SUMMARY

Exemplary embodiments of the present invention are directed to an apparatus and method for measuring motor speed, which is capable of ensuring the accuracy of speed measurement even when a low-resolution encoder is used.

In one embodiment, an apparatus for measuring motor speed may include: an encoder configured to output a signal based on revolution of a motor; and a control unit configured to detect a mechanical angle of the motor according to an output signal of the encoder, estimate an actual angle of the motor based on the detected mechanical angle, and calculate the speed of the motor by differentiating the estimated actual angle.

When estimating the actual angle, the control unit may estimate an angular velocity of the motor, calculate a correction angle based on the estimated angular velocity, and estimate the actual angle based on the calculated correction angle.

The control unit may estimate the actual angle by adding the correction angle to the mechanical angle.

When calculating the speed of the motor, the control unit may calculate an angular velocity by differentiating the estimated actual angle, and calculate the speed of the motor by converting the calculated angular velocity into RPM (Revolution Per Minute).

The apparatus may further include a filter unit configured to low-pass filter the calculated motor speed.

In another embodiment, a method for measuring motor speed may include: detecting, by a control unit, a mechanical angle of a motor according to an output signal of an encoder; estimating, by the control unit, an actual angle of the motor based on the detected mechanical angle; and calculating, by the control unit, the speed of the motor by differentiating the estimated actual angle.

The estimating of the actual angle may include: estimating the angular velocity of the motor; calculating a correction angle based on the estimated angular velocity; and estimating the actual angle based on the calculated correction angle.

In the estimating of the actual angle based on the calculated correction angle, the control unit may estimate the actual angle by adding the correction angle to the mechanical angle.

The calculating of the speed of the motor may include: calculating an angular velocity by differentiating the estimated actual angle; and converting the calculated angular velocity into RPM.

The method may further include low-pass filtering, by the control unit, the calculated motor speed, after the calculating of the speed of the motor.

DETAIL DESCRIPTION OF THE ILLUSTRATED EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
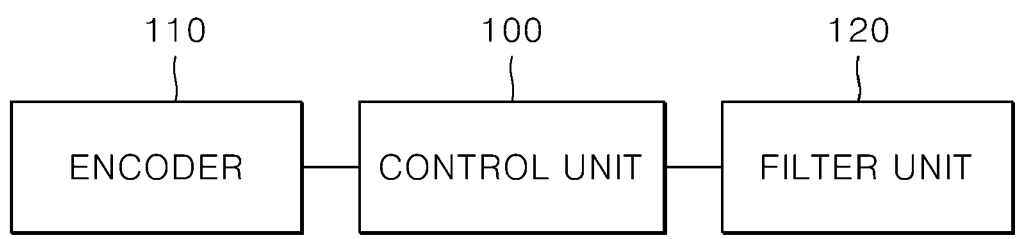
FIG. 1 is a block diagram illustrating the configuration of an apparatus for measuring motor speed in accordance with an embodiment of the present invention.
Figure 2:
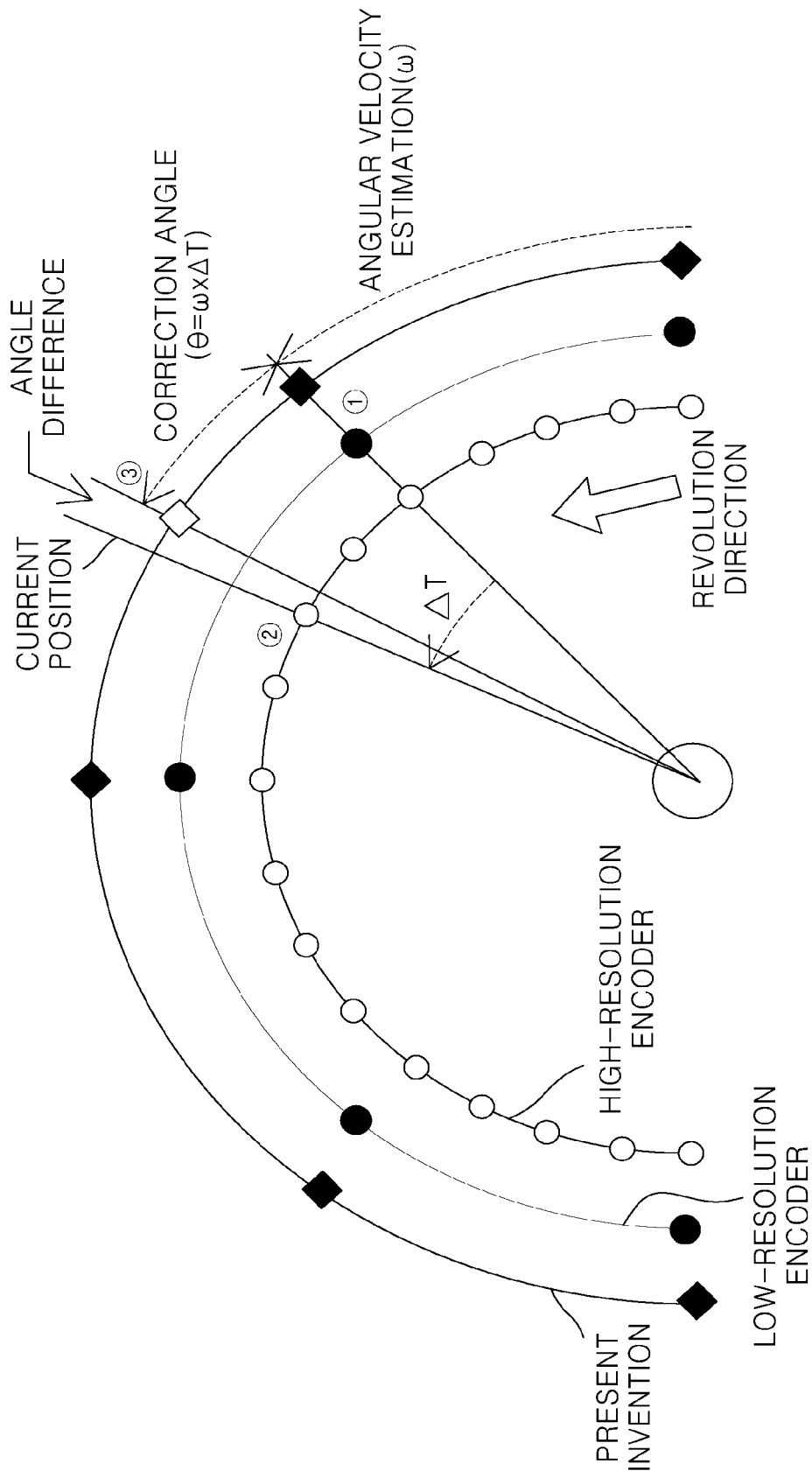
FIG. 2 is a diagram for describing a speed measurement method of the apparatus for measuring motor speed in accordance with the embodiment of the present invention.
Figure 3:
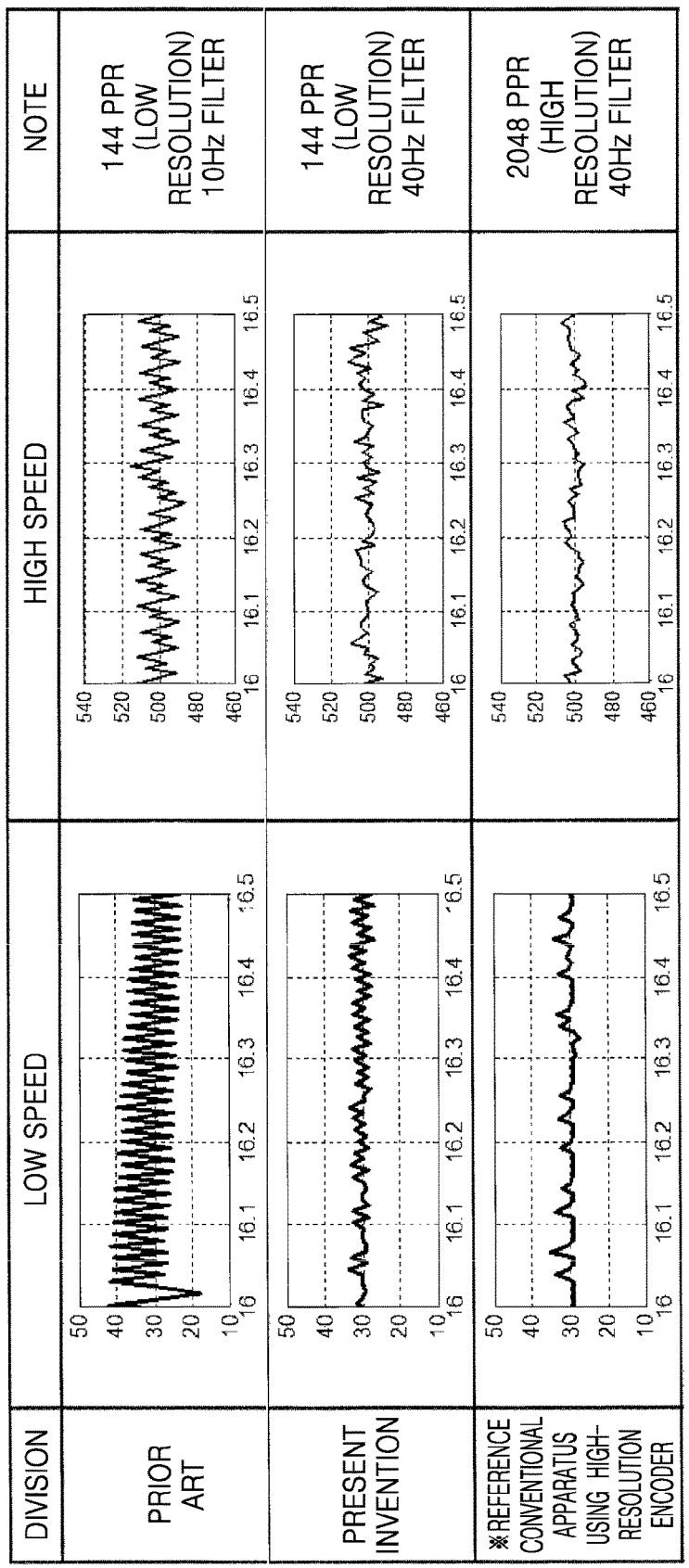
FIG. 3 is a diagram for describing the effect of the apparatus for measuring motor speed in accordance with the embodiment of the present invention.

FIG. 1 is a block diagram illustrating the configuration of an apparatus for measuring motor speed in accordance with an embodiment of the present invention, FIG. 2 is a diagram for describing a speed measurement method of the apparatus for measuring motor speed in accordance with the embodiment of the present invention, and FIG. 3 is a diagram for describing the effect of the apparatus for measuring motor speed in accordance with the embodiment of the present invention. Referring to FIGS. 1 to 3, the apparatus for measuring motor speed in accordance with the present embodiment will be described as follows.

As illustrated in FIG. 1, the apparatus for measuring motor speed in accordance with the present embodiment may include a control unit 100, an encoder 110 and a filter unit 120.

The encoder 110 may output signals according to revolutions of a motor. That is, the encoder 110 may output pulses according to the revolutions of the motor, and the pulses may be represented by PPL (Pulse Per Revolution). The PPR of the encoder 110 is an index indicating the resolution of the encoder. As the PPR of the encoder 110 is high, the encoder 110 may be considered to have high resolution.

The encoder 110 may output A and B pulses having a phase difference of 90 degrees from each other, that is, a duty ratio of 50%, in order to determine the revolution direction of the motor. That is, when the motor is revolved in the forward direction, the phase of the A pulse may lead the phase of the B pulse by 90 degrees. On the other hand, when the motor is revolved in the backward direction, the phase of the B pulse may lead the phase of the A pulse by 90 degrees.

The control unit 100 may detect a mechanical angle of the motor according to an output signal of the encoder 110. That is, as illustrated in FIG. 2, the control unit 100 may detect the position of the motor according to the output signal of the encoder 110. For example, when a low-resolution encoder is used, a position ① may be detected as the position of the motor, and when a high-resolution encoder is used, a position ② may be detected as the position of the motor. At this time, an angle corresponding to the motor position detected through the encoder may be referred to as a mechanical angle. As illustrated in FIG. 2, such a mechanical angle may be detected in a stepwise manner.

The control unit 100 may estimate an actual angle of the motor based on the detected mechanical angle. As illustrated in FIG. 2, when a low-resolution encoder is used, a large difference may occur between the mechanical angle and the actual position of the motor. The difference may serve as a factor which lowers the accuracy of the measurement.

Furthermore, when the speed of the motor is calculated through differentiation on the mechanical angle detected in a stepwise manner, the signal quality may be lowered because a smooth differentiation result is not obtained.

Thus, as the control unit 100 estimates the actual angle of the motor based on the detected mechanical angle, the control unit 100 can more accurately determine the actual position of the motor, while smoothing the slope of the motor angle.

More specifically, the control unit 100 may estimate the angular velocity of the motor, and calculate a correction angle based on the estimated angular velocity. The correction angle may indicate the estimated value of a difference between the detected mechanical angle and the actual position of the motor.

That is, as illustrated in FIG. 2, the control unit 100 may calculate the correction angle by multiplying the estimated angular velocity by a correction time Δt. At this time, the correction time may be calculated through the sampling time of the control unit 100 and the time at which the output signal of the encoder 110 is detected. The sampling time may indicate a time interval at which the motor speed is measured.

The control unit 100 may estimate an actual angle of the motor based on the detected correction angle. For example, the control unit 100 may estimate the actual angle of the motor by adding the correction angle to the detected mechanical angle.

The estimated actual angle of the motor may not accurately coincide with the actual position of the motor, but the accuracy of the speed measurement can be improved because the accuracy of the speed measurement is higher than when the mechanical angle of the motor is used.

Furthermore, since the actual angle of the motor does not appear in a stepwise manner but may be positioned between identification positions by the encoder, the slope of the graph appears in a relatively smooth shape. Thus, noise may be reduced in the motor speed calculation result through differentiation.

When the actual angle of the motor is estimated, the control unit 100 may estimate the angular velocity of the motor through feedback control. That is, since the control unit 100 calculates a angular velocity of the motor during a motor speed calculation process to be described below, the angular velocity may be feedback to estimate the angular velocity of the motor.

The control unit 100 may calculate the speed of the motor by differentiating the actual angle of the motor, which has been estimated through the above-described process. For example, the control unit 100 may calculate the angular velocity by differentiating the estimated actual angle with respect to time, and convert the calculated angular velocity into RPM (Revolution Per Minute), in order to calculate the speed of the motor.

The filter unit 120 may perform low-pass filtering on the calculated motor speed. That is, the filter unit 120 may eliminate noise from the calculated motor speed signal. At this time, the filter unit 120 may have a higher filtering frequency than in the conventional apparatus.

Referring to FIG. 3, the measurement result of the apparatus for measuring motor speed in accordance with the present embodiment and the measurement result of the conventional apparatus will be comparatively described as follows.

For example, the apparatus for measuring motor speed in accordance with the present embodiment may measure the speed of a motor for driving an MDPS (Motor Driven Power Steering) system of a vehicle. In this case, the calculated motor speed may be used as a parameter for performing control logic of the motor through a filtering process.

At this time, a predetermined amount of delay may occur due to the influence of the filtering frequency. Since such a delay element may serve as a performance degradation factor, the delay element needs to be minimized. However, when the bandwidth of the filter is increased in order to minimize the delay element, a side effect may occur. For example, the influence of noise may increase. In the present embodiment, however, when the speed of the motor is measured through the apparatus for measuring motor speed in accordance with the present embodiment, the quality of a calculated signal can be improved. Thus, although the filtering frequency is increased, the influence of noise is not increased.

Furthermore, as illustrated in FIG. 3, even when a low-resolution encoder is used during the motor speed measurement through the apparatus for measuring motor speed in accordance with the present embodiment, it is possible to obtain a similar quality to when a high-resolution encoder is used. Furthermore, the accuracy may be improved more than in the conventional apparatus.

Figure 4:
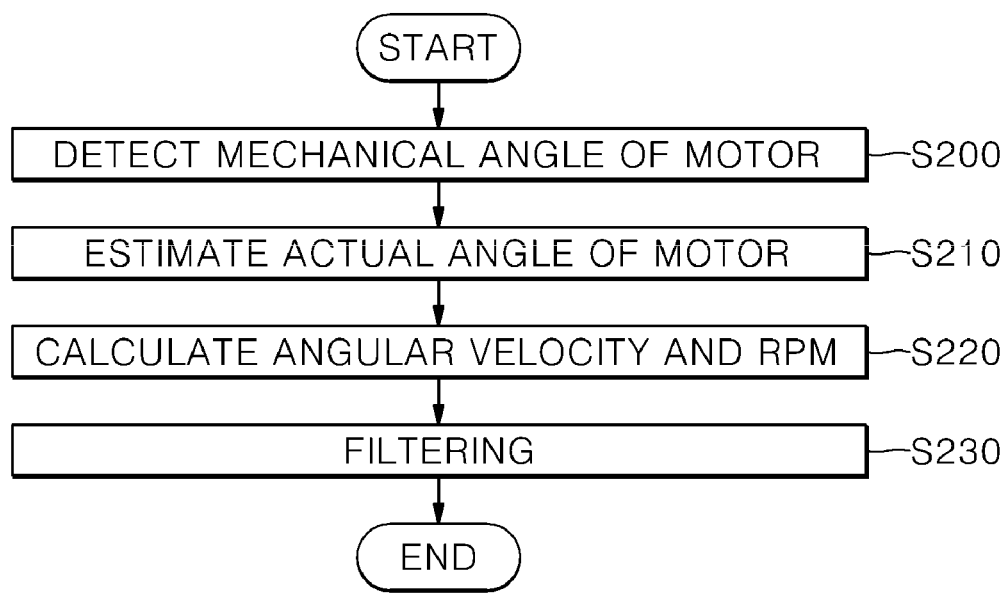
FIG. 4 is a flowchart illustrating a method for measuring motor speed in accordance with an embodiment of the present invention.
Figure 5:
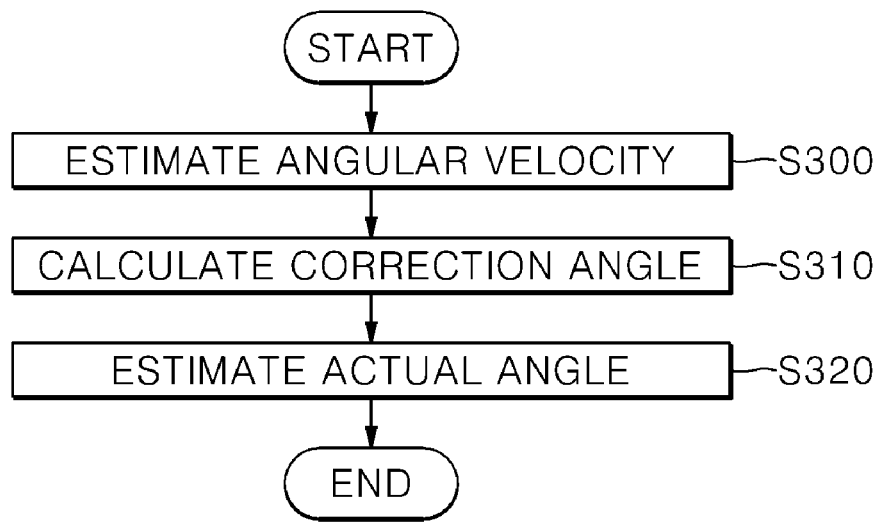
FIG. 5 is a flowchart illustrating an actual angle estimation process of the method for measuring motor speed in accordance with the embodiment of the present invention.

FIG. 4 is a flowchart illustrating a method for measuring motor speed in accordance with an embodiment of the present invention, and FIG. 5 is a flowchart illustrating an actual angle estimation process of the method for measuring motor speed in accordance with the embodiment of the present invention. Referring to FIGS. 4 and 5, the method for measuring motor speed in accordance with the embodiment of the present invention will be described as follows.

As illustrated in FIG. 4, the control unit 100 may detect a mechanical angle of the motor according to an output signal of the encoder 110 at step S200. That is, the encoder 110 may output pulses according to revolutions of the motor. The control unit 100 may detect the position or mechanical angle of the motor through the pulses.

Then, the control unit 100 may estimate the actual angle of the motor based on the mechanical angle measured at step S200, at step S210. That is, as the control unit 100 estimates the actual angle of the motor based on the detected mechanical angle, the control unit 100 may not only more accurately detect the actual position of the motor, but also smooth the slope of the motor angle. Referring to FIG. 5, step S210 will be described in more detail as follows.

As illustrated in FIG. 5, the control unit 100 may measure the angular velocity of the motor at step S300. For example, the control unit 100 may estimate the angular velocity of the motor through feedback control. That is, since the control unit 100 calculates the angular velocity of the motor during a motor speed calculation process to be described below, the angular velocity may be fed back to estimate the angular speed of the motor.

Then, the control unit 100 may calculate a correction angle based on the angular velocity measured at step S300, at step S310. The correction angle may indicate the estimated value of a difference between the detected mechanical angle and the actual position of the motor. That is, the control unit 100 may calculate the correction angle by multiplying the estimated angular velocity by a correction time Δt. At this time, the correction time may be calculated through a sampling time of the control unit 100 and a time at which the output signal of the encoder 110 is detected. The sampling time may indicate a time interval at which the motor speed is measured.

After step S310, the control unit 100 may estimate the actual angle of the motor based on the correction angle calculated at step S310, at step S320. For example, the control unit 100 may estimate the actual angle of the motor by adding the correction angle to the detected mechanical angle.

After step S210 of FIG. 4, the control unit 100 may calculate an angular velocity and RPM by differentiating the actual angle estimated at step S210, at step S220. For example, the control unit 100 may calculate the angular velocity by differentiating the estimated actual angle with respect to time, and calculate the speed of the motor by converting the calculated angular velocity into RPM.

Then, the control unit 100 may perform low-pass filtering on the RPM calculated at step S220, at step S230. That is, the control unit 100 may eliminate noise from the calculated motor speed signal through filtering. At this time, the filtering frequency may be increased more than in the conventional method.

As such, the apparatus and method for measuring motor speed in accordance with the present embodiments may estimate the actual angle of the motor based on the mechanical angle of the motor, detected through the encoder, and calculate the speed of the motor through the estimated actual angle. Thus, even when a low-resolution encoder is used, the apparatus and method can secure the accuracy of the speed measurement.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An apparatus for measuring motor speed, comprising:
    an encoder configured to output a signal based on revolution of a motor;
    a control unit configured to detect a mechanical angle of the motor according to an output signal of the encoder, estimate an actual angle of the motor based on the detected mechanical angle, and calculate the speed of the motor by differentiating the estimated actual angle; and
    a filter unit configured to low-pass filter the calculated motor speed.

2. The apparatus of claim 1, wherein when estimating the actual angle, the control unit estimates an angular velocity of the motor, calculates a correction angle based on the estimated angular velocity, and estimates the actual angle based on the calculated correction angle.

3. The apparatus of claim 2, wherein the control unit estimates the actual angle by adding the correction angle to the mechanical angle.

4. The apparatus of claim 1, wherein when calculating the speed of the motor, the control unit calculates an angular velocity by differentiating the estimated actual angle, and calculates the speed of the motor by converting the calculated angular velocity into RPM (Revolution Per Minute).

5. A method for measuring motor speed, comprising:
    detecting, by a control unit, a mechanical angle of a motor according to an output signal of an encoder;
    estimating, by the control unit, an actual angle of the motor based on the detected mechanical angle;
    calculating, by the control unit, the speed of the motor by differentiating the estimated actual angle; and
    low-pass filtering, by the control unit, the calculated motor speed, after the calculating of the speed of the motor.

6. The method of claim 5, wherein the estimating of the actual angle comprises:
    estimating the angular velocity of the motor;
    calculating a correction angle based on the estimated angular velocity; and
    estimating the actual angle based on the calculated correction angle.

7. The method of claim 6, wherein in the estimating of the actual angle based on the calculated correction angle, the control unit estimates the actual angle by adding the correction angle to the mechanical angle.

8. The method of claim 5, wherein the calculating of the speed of the motor comprises:
    calculating an angular velocity by differentiating the estimated actual angle; and
    converting the calculated angular velocity into RPM.

9. An apparatus for measuring motor speed, comprising:
    an encoder configured to output a signal based on revolution of a motor; and
    a control unit configured to detect a mechanical angle of the motor according to an output signal of the encoder, estimate an actual angle of the motor based on the detected mechanical angle, and calculate the speed of the motor by differentiating the estimated actual angle,
    wherein when calculating the speed of the motor, the control unit calculates an angular velocity by differentiating the estimated actual angle, and calculates the speed of the motor by converting the calculated angular velocity into revolutions per minute (RPM).

* * * * *